United States Patent
Luszcz

(10) Patent No.: US 12,534,187 B2
(45) Date of Patent: Jan. 27, 2026

(54) MODE-DEPENDENT TACTILE FEEDBACK PROFILES FOR AN INCEPTOR

(71) Applicant: Lockheed Martin Corporation, Bethesda, MD (US)

(72) Inventor: Matthew T. Luszcz, Hamden, CT (US)

(73) Assignee: Lockheed Martin Corporation, Bethesda, MD (US)

( * ) Notice: Subject to any disclaimer, the term of this patent is extended or adjusted under 35 U.S.C. 154(b) by 205 days.

(21) Appl. No.: 17/969,431

(22) Filed: Oct. 19, 2022

(65) Prior Publication Data

US 2024/0132202 A1 Apr. 25, 2024
US 2024/0228022 A9 Jul. 11, 2024

(51) Int. Cl.
| | |
|---|---|
| *B64C 13/04* | (2006.01) |
| *B64C 13/10* | (2006.01) |
| *B64C 13/50* | (2006.01) |
| *B64C 27/56* | (2006.01) |
| *G05D 1/46* | (2024.01) |

(52) U.S. Cl.
CPC ............ *B64C 13/10* (2013.01); *B64C 13/042* (2018.01); *B64C 13/0421* (2018.01); *B64C 13/503* (2013.01); *B64C 27/56* (2013.01); *G05D 1/46* (2024.01)

(58) Field of Classification Search
CPC ... B64C 13/042; B64C 13/0421; B64C 13/10; B64C 13/46; B64C 13/507; B64C 27/56
See application file for complete search history.

(56) References Cited

U.S. PATENT DOCUMENTS

| | | |
|---|---|---|
| 9,156,546 B2 | 10/2015 | Irwin, III et al. |
| 9,908,614 B2 | 3/2018 | Cherepinsky et al. |
| 10,556,668 B2 | 2/2020 | Grohmann et al. |
| 10,577,083 B2 | 3/2020 | Grohmann et al. |
| 10,737,769 B1 | 8/2020 | Hohner |

(Continued)

FOREIGN PATENT DOCUMENTS

| | | |
|---|---|---|
| EP | 2821341 A1 | 1/2015 |
| KR | 20200095497 A | 8/2020 |

OTHER PUBLICATIONS

European Patent Office. Extended European Search Report for Application No. 23204074.1, dated Feb. 27, 2024 (8 pages).

*Primary Examiner* — Michael H Wang
*Assistant Examiner* — Colin Zohoori
(74) *Attorney, Agent, or Firm* — Michael Best & Friedrich LLP

(57) ABSTRACT

Systems and methods for providing tactile feedback via an inceptor. A control system for an aircraft includes an inceptor and a controller. The inceptor includes a grip portion moveable between a plurality of positions and one or more motors to apply a variable force to the grip portion. The controller is coupled to the one or more motors. The controller includes an electronic processor and a memory. The controller is configured to operate in a first operating mode, select a first tactile feedback profile associated with the first operating mode, and control the one or more motors based on the first tactile feedback profile. The controller is further configured to detect a transition from the first operating mode to a second operating mode, select a second tactile feedback profile associated with the second operating mode, and control the one or more motors based on the second tactile feedback profile.

20 Claims, 5 Drawing Sheets

(56) References Cited

U.S. PATENT DOCUMENTS

| | | | |
|---|---|---|---|
| 10,967,953 B2 | 4/2021 | Zierten et al. | |
| 2008/0099629 A1* | 5/2008 | Abel | B64C 13/503 |
| | | | 244/223 |
| 2019/0161180 A1 | 5/2019 | Covington et al. | |
| 2020/0198766 A1* | 6/2020 | Dee | B64C 13/08 |
| 2021/0061444 A1 | 3/2021 | Ahmad et al. | |
| 2021/0371084 A1* | 12/2021 | Taylor | B64C 13/507 |
| 2022/0266983 A1* | 8/2022 | Starr | B64C 13/0421 |

* cited by examiner

MODE-DEPENDENT TACTILE FEEDBACK PROFILES FOR AN INCEPTOR

FIELD OF INVENTION

Embodiments described herein relate to aircraft controls and, in particular, to methods for providing tactile feedback via an inceptor while a pilot operates the inceptor.

BACKGROUND

Some rotary wing aircrafts, such as fly by wire aircraft described herein, are controlled via an inceptor. Additionally, the fly by wire aircrafts may include a plurality of control operations for controlling the main rotor assembly, such as a rate command attitude hold operating mode in which the angular rate of the aircraft is proportional to movement of the inceptor. The control operations may also include an attitude command attitude hold operating mode in which the attitude of the aircraft is proportional to movement of the inceptor. However, tracking and knowing which operating mode the aircraft is in can be confusing for pilots as they switch between the modes.

SUMMARY

When providing multiple modes of operation for the inceptor, tactile feedback profiles cueing the pilot of the selected mode may assist in maintaining pilot awareness of the selected mode. Accordingly, embodiments described herein provide a control system for an aircraft, where the control system includes an inceptor and a controller. The inceptor includes a grip portion moveable between a plurality of positions and one or more motors connected to the grip portion to apply a variable force to the grip portion. The controller is coupled to the one or more motors. The controller includes an electronic processor and a memory. The controller is configured to operate in a first operating mode, select a first tactile feedback profile associated with the first operating mode, and control the one or more motors based on the first tactile feedback profile. The controller is further configured to detect a transition from the first operating mode to a second operating mode, select a second tactile feedback profile associated with the second operating mode, and control the one or more motors based on the second tactile feedback profile.

Other embodiments described herein provide a method of operating an aircraft in either a first operating mode or a second operating mode. The method includes controlling, in response to the aircraft operating in the first operating mode, a motor coupled to a grip portion of an inceptor according to a first tactile feedback profile, and controlling, in response to the aircraft operating in the second operating mode, the motor coupled to the grip portion of the inceptor according to a second tactile feedback profile. In the first operating mode, the aircraft operates according to a rate command operating mode. In the second operating mode, the aircraft operates according to an attitude command operating mode.

Further embodiments described herein provide a method for providing feedback via an inceptor, the inceptor including a grip portion and one or more motors connected to the grip portion. The method includes operating in a first operating mode, selecting a first tactile feedback profile associated with the first operating mode, and controlling the one or more motors coupled based on the first tactile feedback profile. The method further includes detecting a transition from the first operating mode to a second operating mode, selecting a second tactile feedback profile associated with the second operating mode, and controlling the one or more motors based on the second tactile feedback profile.

Other aspects will become apparent by consideration of the detailed description and accompanying drawings.

DETAILED DESCRIPTION

Before any embodiments are explained in detail, it is to be understood that the embodiments described herein are provided as examples and the details of construction and the arrangement of the components described herein or illustrated in the accompanying drawings should not be considered limiting. Also, it is to be understood that the phraseology and terminology used herein is for the purpose of description and should not be regarded as limited. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and may include electrical connections or couplings, whether direct or indirect. Also, electronic communications and notifications may be performed using any known means including direct connections, wireless connections, and the like.

It should be noted that a plurality of hardware and software-based devices, as well as a plurality of different structural components may be utilized to implement the embodiments described herein or portions thereof. In addition, it should be understood that embodiments described herein may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects described herein may be implemented in software (stored on non-transitory computer-readable medium) executable by one or more processors. As such, it should be noted that a plurality of hardware and software-based devices, as well as a plurality of different structural components may be used to implement the embodiments described herein. For example, "controller," "control unit," and "control assembly" described in the specification may include one or more processors, one or more memory modules including non-transitory computer-readable medium, one or more input/output interfaces, and various connections (for example, a system bus) connecting the components.

Figure 1:
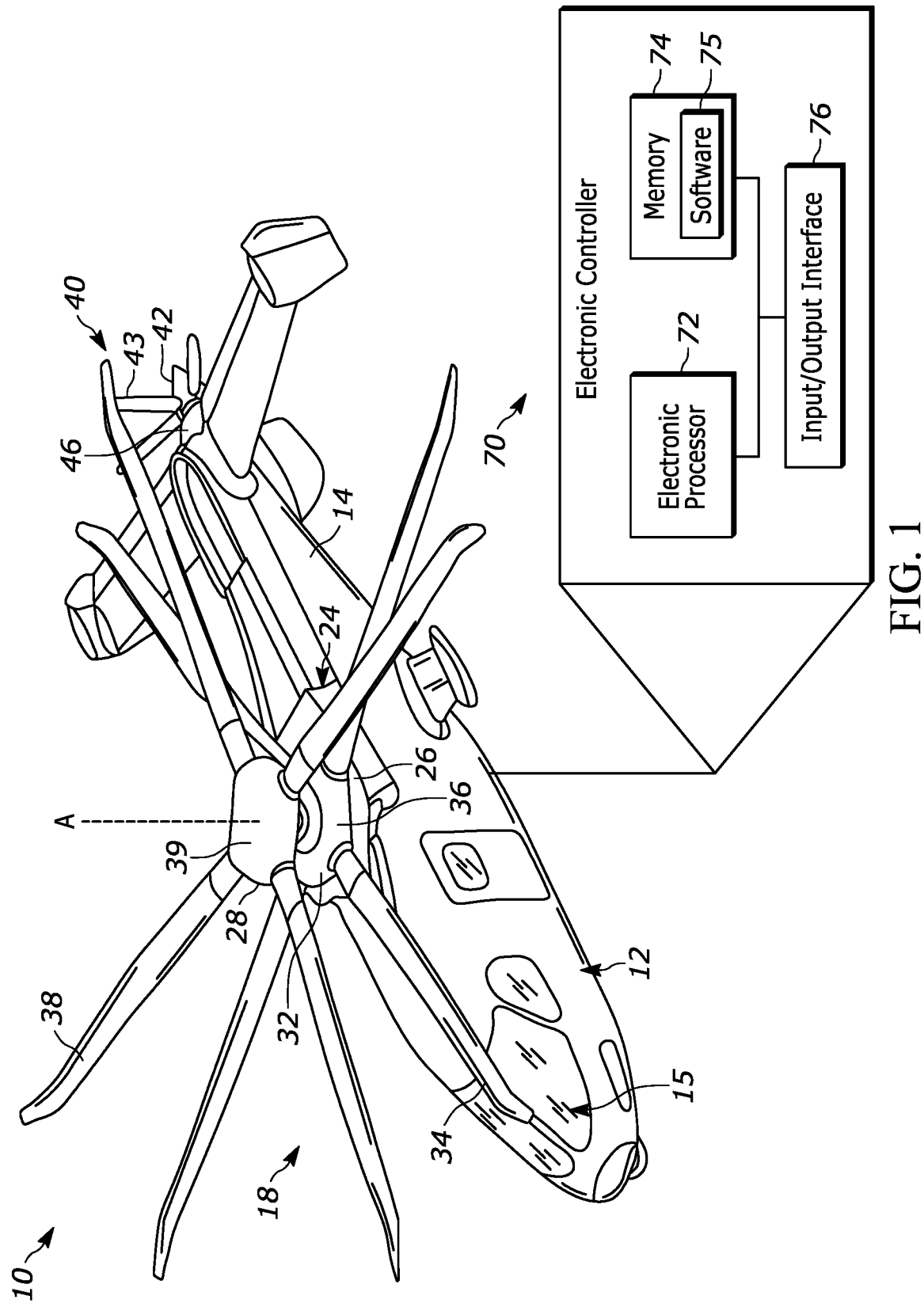
FIG. 1 depicts a rotary wing aircraft according to an exemplary embodiment.

Referring now to the figures, FIG. 1 illustrates a co-axial rotary wing aircraft 10 according to some embodiments. The aircraft 10 includes an airframe 12 with an extending tail 14.

The aircraft 10 includes a dual, counter rotating, co-axial main rotor assembly 18 that rotates about an axis A. The airframe 12 includes a cockpit 15 having one or more seats for flight crew (e.g., pilot and co-pilot) and optional passengers.

The main rotor assembly 18 is driven by a power source, such as, for example, one or more motors 24 via a main rotor gearbox 26. The one or more motors 24 can include an electric motor, a piston engine, a gas turbine, or other device for providing motion.

The main rotor assembly 18 includes an upper rotor assembly 28 driven in a first direction (e.g., counter-clockwise) about the main rotor axis A, and a lower rotor assembly 32 driven in a second direction (e.g., clockwise) about the main rotor axis A, wherein the second direction is opposite to the first direction (i.e., to provide two counter rotating rotors). The upper rotor assembly 28 includes a first plurality of rotor blades 38 supported by a first rotor hub 39. The lower rotor assembly 32 includes a second plurality of rotor blades 34 supported by a second rotor hub 36. As illustrated in FIG. 1, the aircraft 10 further also includes a pusher-propeller 40 located at the extending tail 14 to provide translational thrust (forward or rearward) for the aircraft 10. In some embodiments, the pusher-propeller 40 includes a propeller 42 including a plurality of propeller blades 43.

Although FIG. 1 illustrates the propeller 42 in the context of a pusher-propeller configuration, in other embodiments, the propeller 42 may be a puller-propeller. Similarly, in some embodiments, the propeller 42 may be mounted in a static configuration with respect to the aircraft 10 as illustrated in FIG. 1. However, in other embodiments, the propeller 42 has a variable position, which allows the propeller to provide yaw control in addition to translational thrust. Also, in some embodiments, the aircraft 10 includes more than one pusher-propellers, such as, for example, one positioned on the back left of the aircraft 10 and one positioned on the back right of the aircraft 10.

In some embodiments, the pusher-propeller 40 (i.e., the propeller 42) is connected to and driven by the one or more motors 24 via a propeller gearbox 46. In some embodiments, the propeller gearbox 46 is driven by the main rotor gearbox 26, and the propeller gearbox 46 can be configured to change a gear ratio between the main rotor gearbox 26 and the propeller gearbox 46 to vary, on command, the relative speeds between the main rotor gearbox 26 and the propeller gearbox 46. In such embodiments, the variable gear ratio of the propeller gearbox 46 controls power transmitted from the main rotor gearbox 26 to the propeller gearbox 46. Other configurations for controlling the pusher-propeller 40 are possible, such as, for example, using an engine or power source to drive the pusher-propeller 40 that is separate from the engine or power source used to power the main rotary assembly 18.

As also illustrated in FIG. 1 (in an expanded view), the aircraft 10 includes an electronic controller 70. The electronic controller 70 includes electrical and electronic components that provide power, operation control, and protection to the components and modules within the electronic controller 70. The electronic controller 70 includes an electronic processor 72 (such as a programmable electronic microprocessor or similar device) that executes software to control operation of the main rotor assembly 18 and the pusher-propeller 40. In the example illustrated in FIG. 1, the electronic controller 70 also includes memory 74 (for example, non-transitory, machine-readable memory, such as, for example, a hard disk, a CD-ROM, an optical storage device, a magnetic storage device, a ROM, a programmable read-only memory (PROM), an EEPROM, an erasable programmable read-only memory (EPROM), and a Flash memory) and an input-output interface 76.

The electronic processor 72 is communicatively connected to the memory 74 and the input-output interface 76. In some embodiments, the memory 74 stores software 75 executable by the electronic processor 72 to perform the control functionality and associated methods described herein. It should be understood that the electronic controller 70 can include other components, and the configuration illustrated in FIG. 1 is provided as one example. For example, in some embodiments, the electronic controller 70 includes on one or more microprocessors, digital signal processors, customized processors and field programmable gate arrays (FPGAs) and unique stored program instructions (including both software and firmware) that controls the one or more processors to implement, in conjunction with certain non-processor circuits, the functionality described herein or a portion thereof. Alternatively, the functionality described herein, or a portion thereof, could be implemented by a state machine that has no stored program instructions, or in one or more application specific integrated circuits (ASICs), in which functionality is implemented as custom logic. Of course, a combination of the two approaches could be used.

While FIG. 1 provides an example of a rotary wing aircraft, systems described herein may also be utilized in different types of aircrafts. For example, systems described herein may be utilized in a turboprop aircraft, a piston aircraft, a jet, a fixed wing aircraft, a transport aircraft, an unmanned aerial vehicle (UAV), or some other suitable fly-by-wire aircraft or air vehicle.

Figure 2:
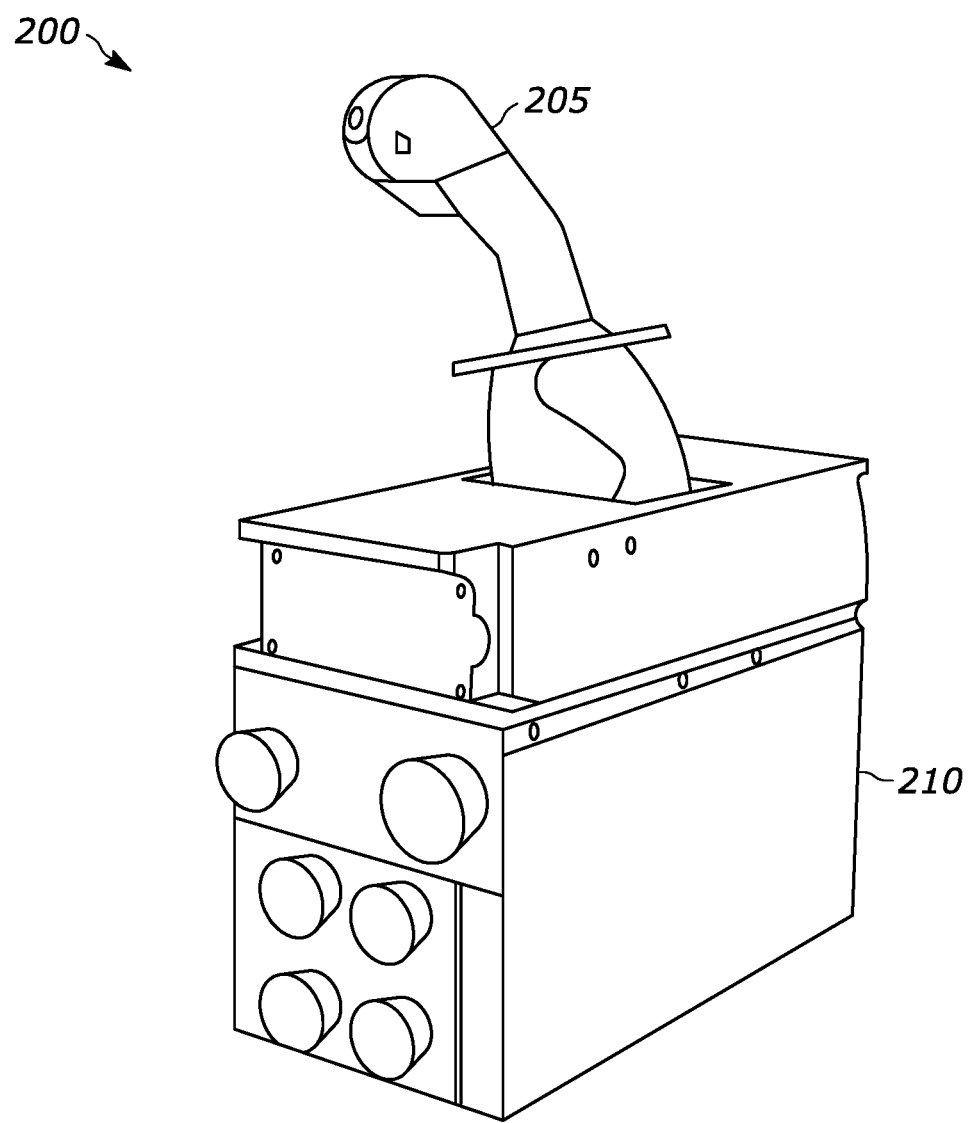
FIG. 2 depicts a perspective view of an example inceptor.

FIG. 2 provides a perspective view of an example inceptor 200 used for controlling movement of the aircraft 10. The inceptor 200 may be located within the cockpit 15. The inceptor 200 includes a grip portion 205 and an inceptor control box 210. The grip portion 205 may be, for example, a cyclic stick used for flight command inputs by an operator (for example, a pilot or user) of the aircraft 10. The grip portion 205 is situated at a neutral point when not being controlled by the operator. The inceptor control box 210 houses, among other things, an inceptor controller, motors, sensors, and actuators used to implement tactile feedback profiles, as described below in more detail.

Figure 3:
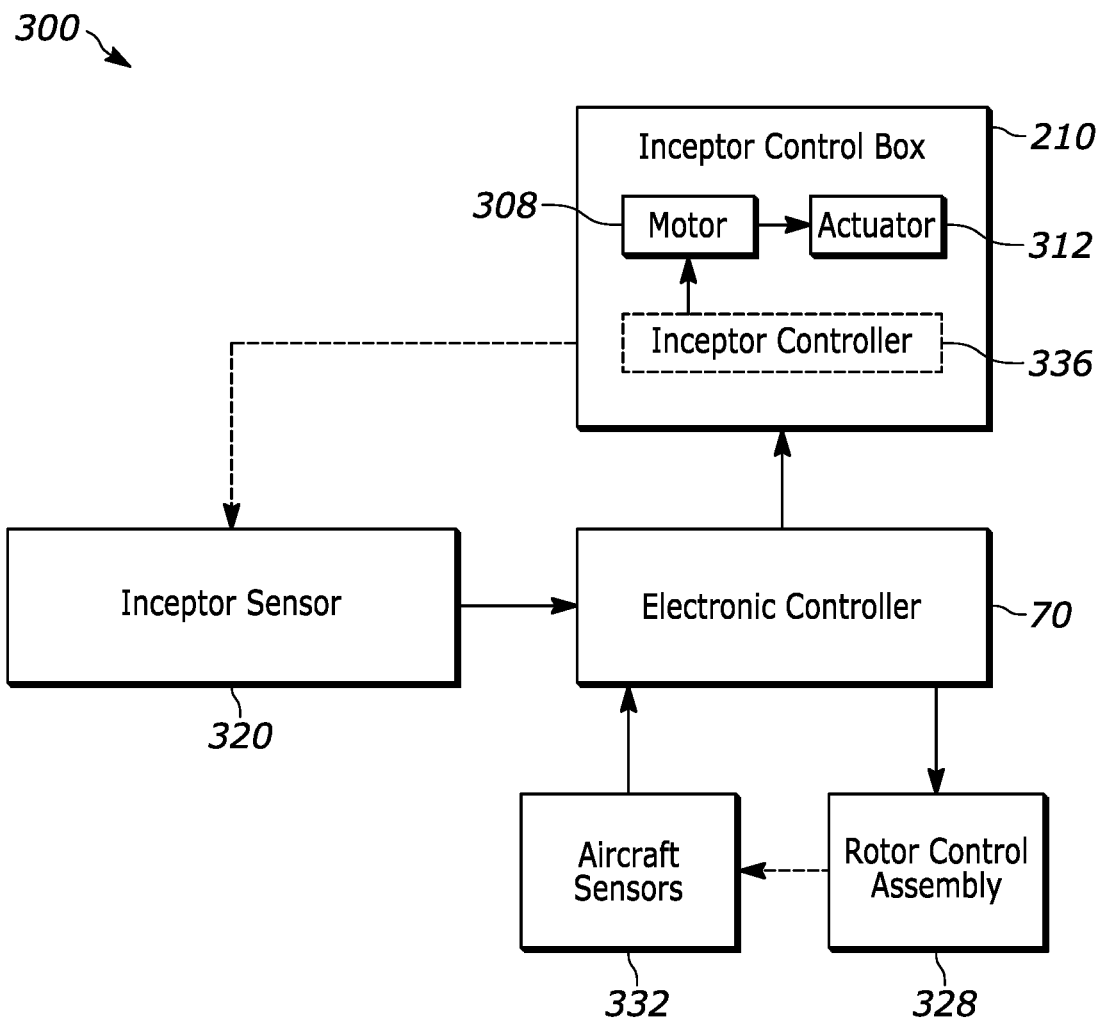
FIG. 3 depicts a control system of the rotary wing aircraft of FIG. 1.

FIG. 3 provides a control system 300 implemented within the aircraft 10 according to some embodiments. The control system 300 includes the electronic controller 70, the inceptor control box 210, an inceptor sensor 320, a rotor control assembly 328, and aircraft sensors 332. As an operator pushes or pulls the grip portion 205 of the inceptor 200, the inceptor sensor 320 senses characteristics of the inceptor 200 for use by the electronic controller 70. For example, the inceptor sensor 320 may be a position sensor configured to sense the displacement of the grip portion 205 and provides a position signal to the electronic controller 70. The electronic controller 70 analyzes the position signal to determine a position of the inceptor 200. In some embodiments, the electronic controller 70 analyzes the position signal to determine an amount of displacement of the grip portion 205. In another example, the inceptor sensor 320 is a force sensor configured to sense a force applied to the grip portion 205. The inceptor sensor 320 provides a force signal to the electronic controller 70. In some instances, the inceptor sensor 320 is located within the inceptor control box 210.

The electronic controller 70 controls the rotor control assembly 328 based on the position of the grip portion 205

(as determined based the position signals). The rotor control assembly 328 includes, for example, the one or more motors 24, the main rotor gearbox 26, and the propeller gearbox 46. As the rotor control assembly 328 is controlled, the plurality of aircraft sensors 332 each generate signals representing a measured operating characteristic of the aircraft 10 (e.g., altitude, airspeed, pitch roll angle, etc.) and transmits the signal to the electronic controller 70 (directly or indirectly). These signals can be used by the electronic controller 70 as part of the control functionality performed by the electronic processor 72 (through execution of the software 75). These signals (or data derived therefrom) can also be stored in the memory 74.

The inceptor control box 210 includes, among other things, an inceptor controller 336, one or more motors 308, and one or more actuators 312 coupled to the one or more motors 308. The inceptor controller 336 controls the motors 308 to actuate the actuators 312, thereby implementing tactile feedback profiles described herein. For example, as the grip portion 205 is displaced, the one or more motors 308 may be controlled to provide resistance against the grip portion 205. The amount of resistance applied to the grip portion 205 affects how easily displaceable the grip portion 216 is from a default position at the origin, and creates a "heavier" or a "lighter" feel. The amount of resistance applied against the grip portion 205 may be varied under different circumstances of different degrees of displacement of the grip portion 205. In some embodiments, the amount of resistance applied to the grip portion 205 may be greater when operating in certain control modes. Additionally, in some embodiments, the amount of resistance applied to the grip portion 205 may be based on a pilot preference. Further, in some embodiments, the amount of resistance applied to the grip portion 205 may vary based on the position of the grip portion 205 (i.e., the degree of displacement). For example, as the grip portion 205 begins to move forward, the electronic controller 70 may provide power to the motor 308, which actuates the respective actuator 312. As the grip portion 205 is pushed further forward, the electronic controller 70 provides greater power to the motor 308, increasing the resistance experienced by the grip portion 205. In some instances, rather than one or motors 308 and one or more actuators 312, the inceptor 200 includes servomotors, magnetic particle clutches, or the like to implement tactile feedback profiles.

In some embodiments, the inceptor controller 336 controls the motors 308 to vary apparent damping (e.g., the force proportional to the rate of displacement of the grip portion 205) and/or the apparent inertia (e.g., resistive force proportional to acceleration of the grip portion 205) instead of, or in addition to, the spring gradient ("heaviness" proportional to the displacement of the grip portion 205). Additionally, the electronic controller 70 may control a travel range of the grip portion 205 by creating hard stops, or a sudden increase in force required once a certain displacement of the grip portion 205 is satisfied. The inceptor controller 336 controls the motor 308 according to these various settings based on the selected control mode of the aircraft 10, described below in more detail. Accordingly, the electronic controller 70 and the inceptor control box 210 combine to provide the ability to create resistance to pilot input that may vary proportional to displacement, rate of stick input, and/or stick acceleration. Additionally, the electronic controller 70 and the inceptor controller 336 may vary these characteristics at various points within the travel of the grip portion 205, such as providing a higher resistance the more the grip portion 205 is displaced from a neutral point.

In some instances, the inceptor controller 336 controls the motors 308 based on signals received from the electronic controller 70. In other instances, the motors 308 are controlled directly by the electronic controller 70.

Figure 4:
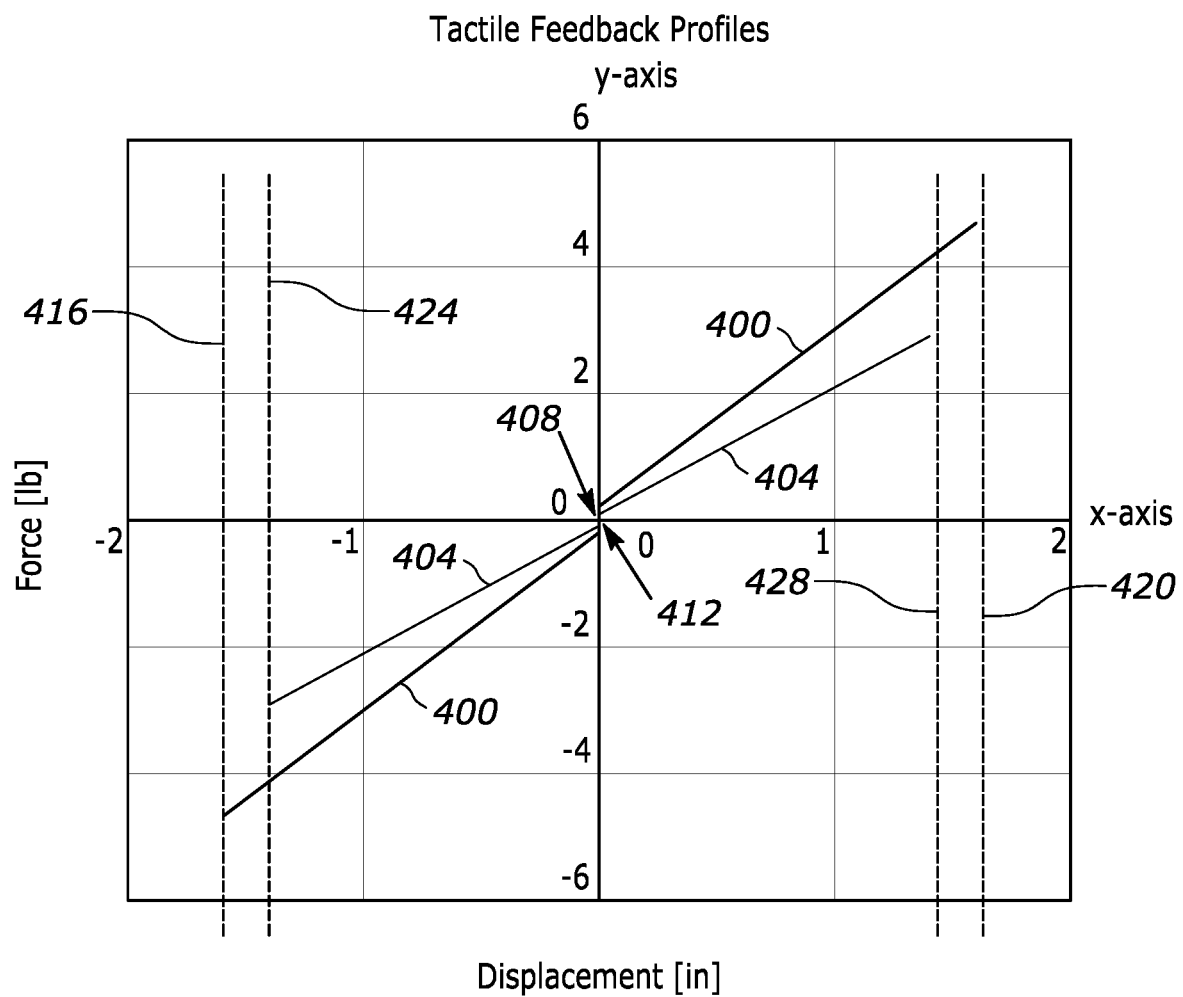
FIG. 4 depicts example tactile feedback profiles implemented by the control system of FIG. 3.

In some embodiments, the amount of resistance experienced by the grip portion 205 is based on a tactile feedback profile (e.g., a force-feel profile). FIG. 4 provides a graph of example tactile feedback profiles implemented via the one or more motors 308 and the one or more actuators 312. FIG. 4 provides two example tactile feedback profiles, a first tactile feedback profile 400 and a second tactile feedback profile 404. While FIG. 4 only illustrates two tactile feedback profiles, in practice, additional tactile feedback profiles may be utilized. Each tactile feedback profile provides an amount of force (shown on the y-axis) required to maintain the grip portion 205 at the current displacement (shown on the x-axis). Displacement may be either positive displacement (in the positive direction of the x-axis) or negative displacement (in the negative direction of the x-axis). For example, if the grip portion 205 is pushed forward to one inch of displacement, the first tactile feedback profile 400 requires approximately three pounds of force to push the grip portion 205 past one inch of displacement. Meanwhile, for the same amount of displacement (i.e., one inch), the second tactile feedback profile 304 requires approximately 2 pounds of force to push the grip portion 205 past one inch of displacement. Each tactile feedback profile may have a different force gradient (e.g., the slope of the required force over displacement distance). In the example illustrated in FIG. 4, the first tactile feedback profile 400 has a greater force gradient than the second tactile feedback profile 404.

In some embodiments, each tactile feedback profile includes a break-out force required to remove the grip portion 205 from its origin (e.g., detent or neutral) position (i.e., zero displacement). In other words, a break-out force represents a minimum amount of force required to move the grip portion 205 out of the detent position. This prevents the grip portion 205 from being inadvertently moved if it is lightly bumped, or from turbulence and vibrations of the aircraft. For example, the first tactile feedback profile 400 has a first break-out force 408 of approximately 0.25 pounds of force, and the second tactile feedback profile 404 has a second break-out force 412 of approximately 0.2 pounds of force. Accordingly, when the inceptor control box 210 is operating according to the first tactile feedback profile 400, a force value defined by the first break-out force 408 is needed to displace the grip portion 205 in either the positive direction or the negative direction. Alternatively, when the inceptor control box 210 is operating according to the second tactile feedback profile 404, a force value defined by the second break-out force 412 is needed to displace the grip portion 205 in a given direction.

Each tactile feedback profile may also include a different maximum displacement value. For example, the first tactile feedback profile 400 includes a first maximum negative displacement 416 and a first maximum positive displacement 420. The second tactile feedback profile 404 includes a second maximum negative displacement 424 and a second maximum positive displacement 428. In the illustrated example, the first tactile feedback profile 400 has a greater maximum displacement (in both the positive direction and the negative direction) than the second tactile feedback profile 404.

The electronic controller 70 may control the aircraft 10 according to several different operating modes. In some embodiments, operating modes correspond to methods of controlling an attitude of the aircraft 10 (e.g., the amount of tilt of the aircraft left and right). For example, in an "attitude command" operating mode, the attitude of the aircraft 10 is controlled directly based on displacement of the grip portion 205 from the origin. When in an attitude command mode, the operator directly controls the attitude of the aircraft 10 via the grip portion 205 while the electronic controller 70 maintains (or holds) one of the other parameters of the aircraft 10, such as another attitude parameter or a velocity of the aircraft.

For example, the grip portion 205 may be moved to the right to initiate a right roll of the aircraft 10 or moved to the left to initiate a left roll of the aircraft 10. The farther right or left the grip portion 205 is displaced, the greater the right or left roll of the aircraft 10, respectively. Likewise, as the grip portion 205 is pushed forward from the origin position, the aircraft 10 may tilt forward (i.e., pitch nose down). As the grip portion 205 is pulled back from the origin position, the aircraft 10 may tilt rearward (i.e., pitch nose up). The farther forward or rearward the grip portion 205 is displaced, the greater the upward or downward pitch of the aircraft 10. At the origin position (or no displacement of the grip portion 205), the attitude of the aircraft 10 is alternatively zero, or at the attitude necessary to maintain a desired trim condition (e.g., constant velocity).

When in the attitude command operating mode, an operator of the inceptor 200 holds the grip portion 205 at the corresponding position to maintain a specific attitude. When the operator releases the grip portion 205, the grip portion 205 will return to the origin and the aircraft 10 will shift towards a neutral attitude.

In some embodiments, the aircraft 10 is controlled according to a "rate command" operating mode. In the rate command operating mode, the angular rate of the aircraft 10 (i.e., the pitch roll) is controlled relative to the body of the aircraft 10 (e.g., a body axis rate). When in a rate command mode, the operator directly controls the rate of the aircraft 10 via the grip portion 205 while the electronic controller 70 maintains (or holds) one of the other parameters of the aircraft 10, such as the attitude of the aircraft.

Displacement of the grip portion 205 in the forward (or positive) direction may add to the angular rate, and displacement of the grip portion 205 in the backward (or negative) direction may subtract from the angular rate. Similarly, displacement of the grip portion 205 towards the left direction or the right direction will add or subtract from the angular rate of the aircraft in the left and right directions. When the grip portion 205 is returned to the origin position, the angular rate is commanded to a zero rate, holding the attitude. For example, the grip portion 205 may be moved to the right to initiate a right roll of the aircraft 10 or moved to the left to initiate a left roll of the aircraft 10. The farther right or left the grip portion 205 is displaced, the greater the right or left roll rate of the aircraft 10, respectively. To reduce the rate at which the aircraft 10 is rolling left or right, the operator brings the grip portion 205 closer to the origin, as zero displacement results in zero commanded rate. To reverse the roll rate of the aircraft 10, the operator displaces the grip portion 205 in the opposite direction of the current rate. To maintain a rate input, the grip portion 205 is held out of detent at the current position. In some instances, the displacement of the grip portion 205 may be inverted such that displacement of the grip portion 205 in the forward direction subtracts from the angular rate, and displacement of the grip portion 205 in the backward direction adds to the angular rate. Similarly, displacement of the grip portion 205 to the left may add to the roll of the aircraft 10 and displacement of the grip portion 205 to the right may subtract from the roll of the aircraft 10.

Each operating mode requires different movements from the operator of the aircraft 10. For example, in the attitude command operating mode, the operator performs larger movements of the grip portion 205, and may hold the grip portion 205 in a given position for an extended period of time in order to maintain the aircraft 10 at a desired attitude. Accordingly, it may be desirable to provide a lighter feel of the grip portion 205 (i.e., a more easily displaceable grip portion) by reducing the resistance applied to the grip portion 205. In the rate command operating mode, however, the grip portion 205 may be displaced only small amounts (unless the aircraft 10 is being flown aggressively), and may be primarily located near the origin position. Therefore, it may be desirable to provide a "heavier feel" of the grip portion 205 (i.e., a less easily displaceable grip portion) by increasing the resistance applied to the grip portion 205.

Figure 5:
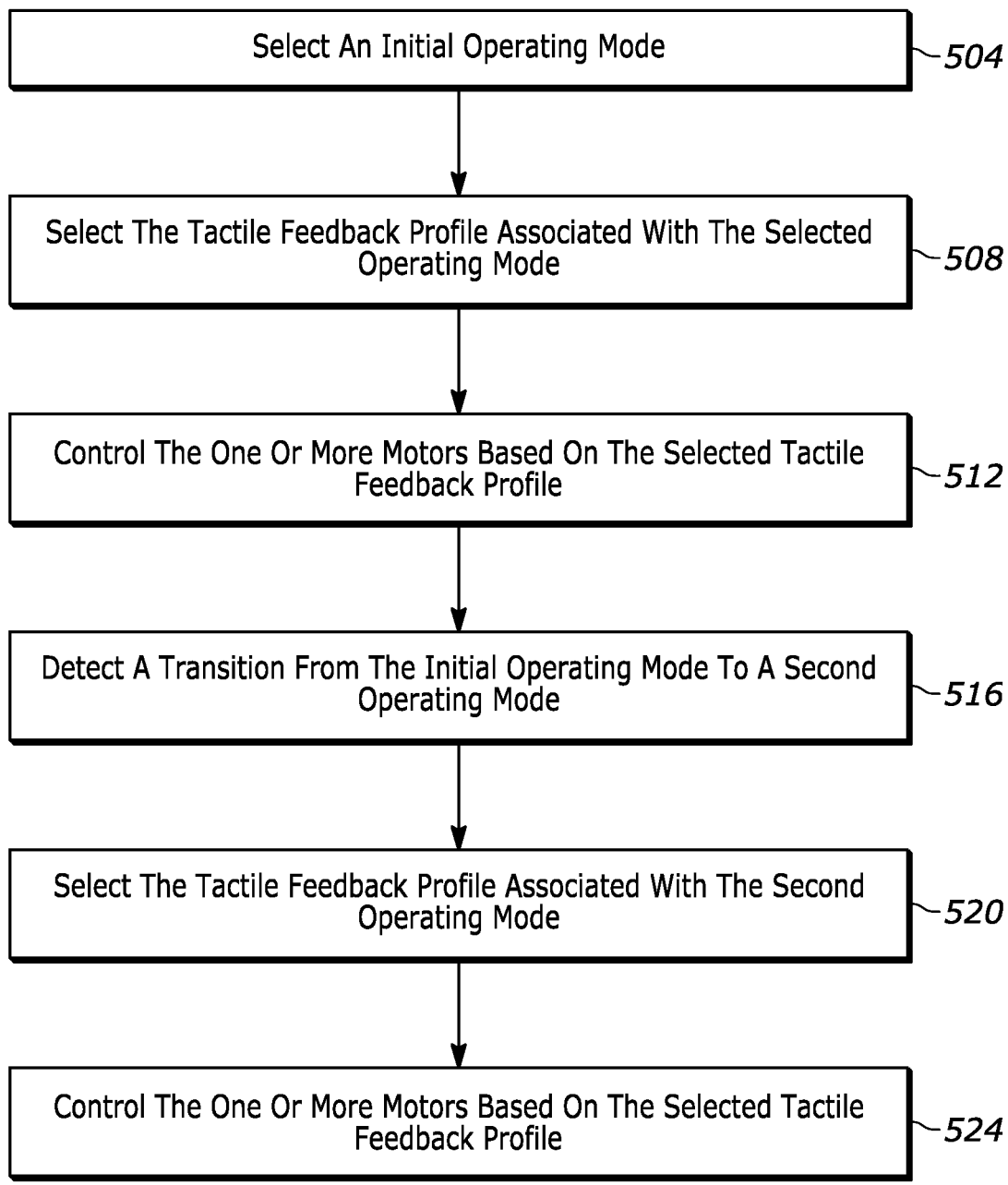
FIG. 5 depicts a method performed by the control system of FIG. 3.

The electronic controller 70 may control the one or more motors 208 (via the inceptor controller 336) based on which operating mode the aircraft 10 is operating within to provide feedback for the given operating mode. FIG. 5 provides a method 500 for providing force feedback via the grip portion 205. The method 500 may include more or less steps than illustrated. Additionally, steps of the method 500 may be performed in a different order. At step 504, the electronic controller 70 selects an initial operating mode. For example, an operator of the aircraft 10 may push a button, select from a user interface, or otherwise select an operating mode of the aircraft 10. In some embodiments, the aircraft 10 may have a default operating mode selected on power-up. In some embodiments, the initial operating mode is either the attitude command operating mode or the rate command operating mode, as described above.

At step 508, the electronic controller 70 selects the tactile feedback profile that corresponds to (or is otherwise associated with) the selected operating mode. In some embodiments, when the selected operating mode is the rate command operating mode (for example, a rate command, attitude hold operating mode), the electronic controller 70 selects the first tactile feedback profile 300. In some embodiments, when the selected operating mode is the attitude command operating mode (for example, an attitude command, attitude hold operating mode), the electronic controller 70 selects the second tactile feedback profile 304. At step 512, the electronic controller 70 controls the one or more motors 308 based on the selected tactile feedback profile. For example, the electronic controller 70 receives the current position of the grip portion 205. The electronic controller 70 refers to the selected tactile feedback profile to determine an amount of power to provide to the motor 308.

In some embodiments, the electronic controller 70 may provide the selected tactile feedback profile and the position of the grip portion 205 to the inceptor controller 336. The inceptor controller 336 then controls the motor 308 according to the selected tactile feedback profile.

At step 516, the electronic controller 70 detects a transition from the initial operating mode to a second operating mode. For example, the operating mode may transition from the rate command operating mode to the attitude command operating mode, or from the attitude command operating mode to the rate command operating mode. The transition may come from a new selection of an operating mode (as described in step 504). In some embodiments, the electronic controller 70 determines to change operating modes based on movement of the grip portion 205. In some embodiments, the electronic controller 70 controls the one or more motor 308 and the one or more actuators 312 to provide haptic feedback via the grip portion 205 (for example, vibrate) in response to the change in operating mode.

At step 520, the electronic controller 70 selects the tactile feedback profile associated with the second operating mode, as described with respect to step 508. At step 524, the electronic controller 70 controls the one or more motors 308 based on the selected tactile feedback profile, as described with respect to step 512.

By implementing the first tactile feedback profile 400 with the rate command operating mode, the grip portion 205 feels "heavier" to an operator as they experience increased resistance compared to the second tactile feedback profile 404. Accordingly, the first tactile feedback profile 400 assists the operator in making less movement of the grip portion 205, and naturally pushes the operator towards the direction of the origin position. Comparatively, use of the second tactile feedback profile 404 with the attitude command mode allows for easier movement of the grip portion 205 such that an operator of the aircraft 10 can quickly adjust the attitude of the aircraft 10.

The electronic controller 70 may be configured to dynamically blend between the initial tactile feedback profile and the selected tactile feedback profile to smooth the transition between tactile feedback profiles. For example, the electronic controller 70 may implement an intermediate tactile feedback profile between the first tactile feedback profile 400 and the second tactile feedback profile 404 (e.g., between step 520 and step 524). In some embodiments, the electronic controller 70 implements the intermediate tactile feedback profile for a predetermined time period (for example, 2 seconds) before implementing the selected tactile feedback profile.

By providing the tactile feedback profiles via the one or more motors 308 and the one or more actuators 312, the operator may be able to quickly identify the current operating mode of the aircraft 10 based on the "feel" of the grip portion 205 (e.g., how hard the grip portion 205 is to move). Additionally, the operator may be able to identify how far to push the grip portion 205 for the desired angular rate or attitude value based on the "feel" of the grip portion 205. Accordingly, use of the tactile feedback profiles with the grip portion 205 help reduce operating errors and improve modal awareness without forcing the pilots to rely on visual indications in the cockpit or other display systems.

While embodiments disclosed herein primarily refer to an attitude command operating mode and a rate command operating mode, additional modes of operation may be implemented. For example, additional modes of operation may hold different parameters of the aircraft 10 constant. These may include attitude hold operating modes, rate hold operating modes, and velocity hold operating modes that are implemented by the electronic controller 70. In some embodiments, the electronic controller 70 implements a translational rate command mode. Each operating mode may have a unique tactile feedback profile.

Additionally, while embodiments disclosed herein have primarily referred to an aircraft 10 having a single inceptor 200, in some instances, the aircraft 10 has multiple inceptors 200 (for example, a first inceptor for a pilot and a second inceptor for a co-pilot). In such an instance, the electronic controller 70 controls motors 308 in each inceptors 200 to provide the selected tactile feedback profile to each inceptor 200. Additionally, as the first inceptor is operated by the pilot, the electronic controller 70 may control the motors 308 in the second inceptor to "mirror" the operation of the first inceptor, providing coordination between the pilot and the co-pilot.

Various features and advantages of the embodiments described herein are set forth in the following claims.

What is claimed is:

1. A control system for an aircraft, the control system comprising:
    an inceptor including a grip portion moveable between a plurality of positions and one or more motors connected to the grip portion to apply a variable force to the grip portion; and
    a controller coupled to the one or more motors, the controller including an electronic processor and a memory, the controller configured to:
        operate in a first operating mode,
        select a first tactile feedback profile associated with the first operating mode,
        control the one or more motors based on the first tactile feedback profile,
        detect a transition from the first operating mode to a second operating mode,
        select a second tactile feedback profile associated with the second operating mode, and
        control the one or more motors based on the second tactile feedback profile,
    wherein the first operating mode is an attitude command mode and wherein the second operating mode is a rate command mode,
    wherein, in the attitude command mode, a displacement of the grip portion corresponds to a set attitude of the aircraft, and
    wherein, in the rate command mode, a displacement of the grip portion corresponds to a set angular rate of the aircraft,
    wherein an amount of maximum displacement distance of the grip portion is dependent on the mode of operation.

2. The control system of claim 1, wherein, when in the attitude command mode, the controller is configured to:
    receive an updated position of the grip portion, and
    adjust the attitude of the aircraft based on the updated position.

3. The control system of claim 1, wherein, when in the rate command mode, the controller is configured to:
    receive an updated position of the grip portion, and adjust the angular rate of the aircraft based on the updated position.

4. The control system of claim 1, wherein each motor of the one or more motors is coupled to an actuator, wherein the actuator is situated between the respective motor and the grip portion, wherein movement of the respective motor causes the respective actuator to actuate and provide a force onto the grip portion.

5. The control system of claim 1, wherein a force gradient defined by the second tactile feedback profile is greater than a force gradient defined by the first tactile feedback profile.

6. The control system of claim 1, wherein a breakout force defined by the second tactile feedback profile is greater than a breakout force defined by the first tactile feedback profile.

7. The control system of claim 1, wherein the controller is further configured to receive a selection of the first operating mode or the second operating mode via a switch coupled to the inceptor.

8. The control system of claim 1, wherein the controller is further configured to provide, in response to detecting a transition from the first mode of operation to the second mode of operation, haptic feedback with the inceptor.

9. The control system of claim 1, wherein the control system further includes a position sensor coupled to the inceptor and in communication with the controller, wherein the controller is configured to receive position signals from the position sensor.

10. The control system of claim 1, wherein the amount of maximum displacement for each mode of operation is the same amount for both a positive and a negative displacement.

11. A method of operating an aircraft in either a first operating mode or a second operating mode, the method comprising:
controlling, in response to the aircraft operating in the first operating mode, a motor coupled to a grip portion of an inceptor according to a first tactile feedback profile; and
controlling, in response to the aircraft operating in the second operating mode, the motor coupled to the grip portion of the inceptor according to a second tactile feedback profile;
wherein, in the first operating mode, the aircraft operates according to a rate command operating mode, and
wherein, in the second operating mode, the aircraft operates according to an attitude command operating mode,
wherein, in the attitude command mode, a displacement of the grip portion corresponds to a set attitude of the aircraft, and
wherein, in the rate command mode, a displacement of the grip portion corresponds to a set angular rate of the aircraft,
wherein an amount of maximum displacement distance of the grip portion is dependent on the mode of operation.

12. The method of claim 11, wherein the first tactile feedback profile has a greater force gradient than the second tactile feedback profile.

13. The method of claim 11, wherein the first tactile feedback profile has a greater breakout force than the second tactile feedback profile.

14. The method of claim 11, wherein the first tactile feedback profile has a greater maximum displacement than the second tactile feedback profile.

15. The method of claim 11, wherein the amount of maximum displacement for each mode of operation is the same for both a positive and a negative displacement.

16. A method for providing feedback via an inceptor, the inceptor including a grip portion and one or more motors connected to the grip portion, the method comprising:
operating in a first operating mode;
selecting a first tactile feedback profile associated with the first operating mode;
controlling the one or more motors based on the first tactile feedback profile;
detecting a transition from the first operating mode to a second operating mode;
selecting a second tactile feedback profile associated with the second operating mode; and
controlling the one or more motors based on the second tactile feedback profile,
wherein the first operating mode is an attitude command mode and wherein the second operating mode is a rate command mode,
wherein, in the attitude command mode, a displacement of the grip portion corresponds to a set attitude of an aircraft, and
wherein, in the rate command mode, a displacement of the grip portion corresponds to a set angular rate of the aircraft,
wherein a maximum displacement distance of the grip portion is dependent on the mode of operation.

17. The method of claim 16, wherein a force gradient defined by the second tactile feedback profile is greater than a force gradient defined by the first tactile feedback profile.

18. The method of claim 16, wherein a breakout force defined by the second tactile feedback profile is greater than a breakout force defined by the first tactile feedback profile.

19. The method of claim 16, further comprising receiving a selection of the first operating mode or the second operating mode via a switch is coupled to the incept.

20. The method of claim 16, wherein the amount of maximum displacement for each mode of operation is the same for both a positive and a negative displacement.

* * * * *